Dec. 19, 1944.   H. W. JONES   2,365,275
BLOWPIPE MACHINE
Filed Nov. 7, 1941
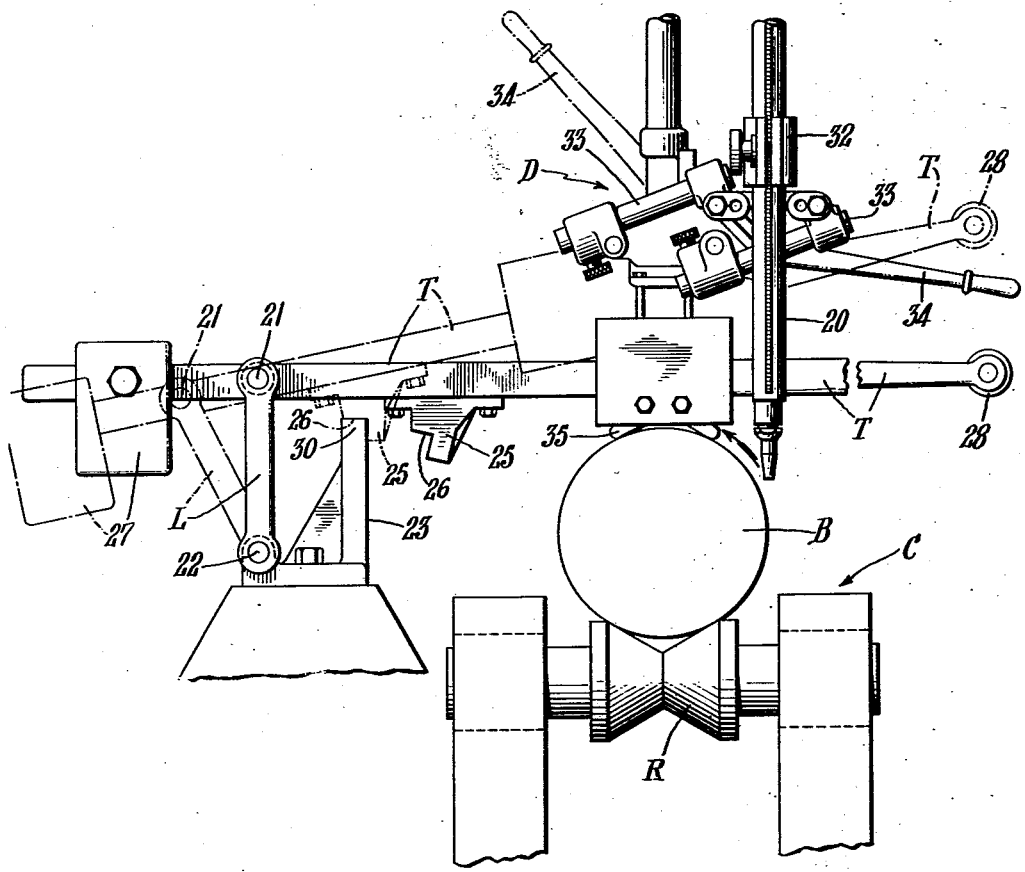
INVENTOR
HOMER W. JONES
BY
ATTORNEY Patented Dec. 19, 1944

2,365,275

UNITED STATES PATENT OFFICE 2,365,275

BLOWPIPE MACHINE

Homer W. Jones, Westfield, N. J., assignor to The Linde Air Products Company, a corporation of Ohio Application November 7, 1941, Serial No. 418,234

8 Claims. (Cl. 266—23)

This invention relates to blowpipe machines, and more particularly to a machine for thermochemically cutting ferrous metal bodies such as steel bars and billets of various sizes and shapes.

Steel bars, billets, and the like have previously been cut by blowpipe or torch-translating machines which move an oxidizing gas jet discharged from a gas-cutting torch, transversely of the bar being cut at a suitable cutting speed to thermochemically form a kerf therethrough. Such bars, and billets are usually of various sizes and may be either round or rectangular according to the type or types of products the mill is rolling. Such prior art machines, however, are often specially constructed and arranged for cutting bars of a particular size and/or shape and a machine adapted for cutting round bars or billets is not suitable for cutting rectangular stock and vice versa. Such machines also cannot be readily and efficiently withdrawn to an inoperative position out of the way of other mechanisms and, often, it is necessary to provide a different machine for each commercial application.

It is the principal object of the present invention to provide an improved blowpipe-translating machine for thermochemically severing ferrous metal bodies such as round and/or rectangular steel bars, billets, slabs, plates, and the like.

Other objects of this invention are to provide an improved blowpipe machine which may be installed adjacent a conveyor line which carries such bars and billets; to provide such a machine which includes an improved propelling mechanism for moving the blow pipe in a predetermined path substantially parallel to a work surface of either a flat or arcuate contour; to provide such a machine including an improved supporting means for supporting the blowpipe and such a blowpipe propelling mechanism or device; to provide such a machine which includes a blowpipe propelling device mounted on a supporting boom pivotally connected to a substantially vertical link member pivotally connected to a support; to provide such a machine including a blowpipe propelling device and supporting means so constructed and arranged as to permit the blowpipe device to be readily manually positioned in either an operative or inoperative position; to provide such a machine which is constructed and arranged to permit substantially horizontal movement of the blowpipe propelling device for positioning the device with respect to different sizes of bars and billets; to provide such a machine which is constructed and arranged so as to permit arcuate movement in a vertical transverse plane for moving the blowpipe propelling device toward or away from the workpiece; and to provide such a machine which is relatively simple and rugged in construction and economical to manufacture.

These and other objects and novel features will become apparent from the following description, taken in connection with the accompanying drawing, which is an elevational view of a cutting machine embodying the principles of the present invention.

Referring to the drawing which shows a machine embodying the principles of the present invention, the workpiece, such as a round steel billet B, may be supported by and movable along a conventional type of conveyor such as a roll table conveyor C which may include V'd rollers R. The rollers R may be driven by a motor, not shown, for moving the billet B into cutting position or the billet may be manually moved along the conveyor rollers R or the billet may be moved into position by an external pusher or other suitable means. The rollers R may be cylindrical for supporting and longitudinally propelling a rectangular bar. The cutting machine includes a blowpipe or torch supporting and propelling device or mechanism D which is adapted to support and propel a torch 20 through a predetermined path substantially parallel with either an arcuate surface or a flat surface. The torch propelling device is substantially the same as the torch propelling device shown and described in United States Letters Patent No. 2,283,345 issued May 19, 1942, to L. W. Young.

The torch supporting and propelling mechanism or device D is mounted on a supporting member or boom T which is pivotally connected at 21 to a supporting link L which is in turn pivotally mounted at 22 to a base 23 adjacent one side of the billet B. The boom T has attached thereto, a latch 25 having a notch 26 formed therein. The counterweight 27 is adjustably mounted on the rear end of the boom T to counterbalance at least a portion of the weight of the torch supporting and propelling device D and the forward end of the boom T. To the forward end of the boom T there is fastened a handle 28 adapted to be manually grasped by the operator. When it is desirable to swing the boom T upwardly to an inoperative or non-operating position and out of the way of any bodies which may be moved along the roll table C, the operator grasps the handle 28 and easily raises the forward end of the boom T through an arc about the pivotal connection 21 and simultaneously pushes rearwardly on the handle 28 which causes the link L to swing rearwardly about the pivotal connection 22. Thus, the boom T is swung upwardly and is moved rearwardly to move the blowpipe device D upwardly and outwardly away from the bar B until the notch 26 of latch 25 engages the end of an upwardly extending leg or stop 30 of base member 23 which holds the boom T in the raised or inoperative position as shown in broken lines in the drawing.

In the drawing, the machine as shown is in full lines in the operative position and the torch 20 is shown in the position assumed at the start of a cut. It may be preferable to start the cut at the opposite side of the boom B in which event the blowpipe supporting and propelling device D may be reversed.

The blowpipe supporting and propelling device D may be readily lowered to an operative position adjacent the same billet B or another bar or billet. The operator can grasp the handle 28 and free the latch 25 from stop 30 and lower the device D to an operative position adjacent the workpiece in which position the boom T is supported by the link L and the workpiece. The link L is pivotally connected to both the base 23 and the boom T so as to permit both vertical and horizontal movement of the boom T and the torch propelling device D in a vertical transverse plane relative to the longitudinal axis of the billet B whereby the device D can be readily moved to either an operative or inoperative position and can be readily positioned in an operative position adjacent a workpiece of a different size.

The torch 20 is vertically adjustably mounted in the bracket 32 which is pivotally connected to the outer ends of the links 33. A handle 34 is provided and is manually movable from the position shown in broken lines to the position shown in full lines, to preload the machine. Upon the operation of a suitable releasing mechanism, the links 33 are moved through an arc to move the torch 20 through an arcuate path across the billet B. Suitable means, not shown, are provided for controlling the flow of gases to the torch 20 which is adapted to discharge both a cutting gas stream, such as a stream of oxygen and preferably a plurality of jets of a combustible gas mixture, such as a mixture of oxygen and acetylene, which burn upon ignition, to form preheat flames to aid in more efficiently severing the body.

The bar cutting machine includes a boom support or V-shaped work-engaging member 35 which is adapted to engage the upper surface of a round bar or billet. The work-engaging member 35 may be attached to the device D or the boom T and tends to urge the boom T into such a transverse position that the blowpipe is positioned correctly (the member 35 acts as a centering means to generally center the blowpipe propelling device D over the billet B) with respect to the workpiece which may be any one of a plurality of sizes. When rectangular bars or slabs are to be cut the machine may be provided with different types of members for engaging the work. The radius of the arcuate path through which the torch nozzle 36 is moved can be readily changed by adjusting the effective length of the links 33. The nozzle 36 can be moved through a substantially straight-line path by changing the connections between links 33 and bracket 32 so as to move the outer ends of the links toward each other as shown and described in the previously referred to Patent 2,283,345 to L. W. Young.

When not in operation, the boom T and device D are maintained in the inoperative position by notch 26 resting on stop 30. After the bar, such as a billet B, has been correctly positioned on the conveyor C, the operator grasps the handle 28 and frees the latch 25 from engagement with the stop 30 and lowers the boom T until the member 35 engages the billet B, as shown in the drawing. The operator then manually moves the lever 34 to the position shown in full lines, which moves the torch 20 to the starting position and preloads the device. The preheat gases are turned on and ignited to heat a zone of surface metal to the oxygen ignition temperature. After a short preheat pause, the cutting oxygen is turned on and simultaneously a suitable release mechanism is actuated so that the blowpipe is automatically moved across the billet in a predetermined speed relation thereto to form a kerf therethrough. After the billet has been severed, the gases are turned off, the boom T is manually moved to the inoperative position, and the billet B is either repositioned for a second cut or another bar is moved into position.

Having described the invention in detailed it is obvious that alterations can be made in the apparatus shown without departing from the spirit or scope of the invention. For instance, a different device could be used for propelling the torch across the bar and one or more torches may be used simultaneously. Other sizes and shapes of bars could be severed and other types of blowpipe torches could be propelled across such a body for welding, hardening, or heat treating the body.

What is claimed is:

1. A machine for supporting and propelling a blowpipe across a metal body in order to perform an oxygen cutting operation upon the latter, which comprises the combination of a base adapted to be mounted adjacent one side of said body; an elongated boom extending transversely of said body; connective means connecting said base and one end portion of said boom, so that a free end portion thereof can be moved longitudinally forwardly and rearwardly and swung upwardly and downwardly in an arcuate path; a blowpipe; a device for supporting and propelling said blowpipe carried by said boom adjacent said free end portion; and boom support means associated with said free end portion for engaging said body and for supporting said free end portion, and said device carried thereby in a relatively fixed position during the operation of said device, the said support means and said device being together adapted to maintain the blowpipe and the metal body in a predetermined spaced relation during the cutting of said body; all of said parts being so arranged that the free end portion of said boom and said device can be moved forwardly and downwardly into operative position adjacent said body or rearwardly and upwardly into inoperative position substantially spaced away from said body.

2. A machine as defined in claim 1, wherein said connective means comprise a link pivotally connected at one end to said base and pivotally connected at its other end to said boom and wherein said boom support means are adapted for positioning said device generally centrally above said metal body by contact with the latter.

3. A machine as defined in claim 1, wherein said connective means comprise a link pivotally connected at one end to said base and pivotally connected at its other end to said boom and wherein said boom support means are adapted for positioning said device generally centrally above said metal body by contact with the latter and are adapted to engage a plurality of sizes of such metal bodies; and which further includes means for holding and supporting said boom and said attached supporting and propelling device in inoperative position.

4. A machine as defined in claim 1 wherein said boom support means are adapted for positioning said device generally centrally above said metal body by contact with the latter and are adapted to engage a plurality of sizes of such metal bodies; and which further includes means associated with said first mentioned end portion of said boom for counterbalancing at least in part the weight of said device and means for holding and supporting said boom and said device carried thereby in inoperative position.

5. A machine for supporting and propelling a blowpipe across a body in order to perform an oxygen cutting operation upon the latter, which comprises the combination of a base adapted to be mounted adjacent one side of said body; an elongated boom extending transversely of said body; connective means connecting said base and one end portion of said boom so that a free end portion thereof can be moved longitudinally forwardly and rearwardly and swung upwardly and downwardly in an arcuate path; a blowpipe; a device for supporting and propelling said blowpipe carried by said boom adjacent said free end portion; and centering means for said device adapted to contact said body and associated with said free end portion of the boom for engaging said body, and for supporting said free end portion and said supporting and propelling device carried thereby in a relatively fixed position during the propulsion of said blowpipe, the said centering means and said device being together adapted to maintain the blowpipe and said body in a predetermined spaced relation during the cutting of the latter; all of said parts being so arranged that the free end portion of said boom and said device can be moved forwardly and downwardly into operative position adjacent said body or rearwardly and upwardly into inoperative position substantially spaced away from said body.

6. A machine for supporting and propelling a blowpipe across a metal body in order to perform an oxygen cutting operation upon the latter, which comprises the combination of a base adapted to be mounted adjacent one side of said body; an elongated boom extending transversely of said body; connective means connecting said base and one end portion of said boom so that a free end portion thereof can be moved longitudinally forwardly and rearwardly and swung upwardly and downwardly in an arcuate path; a blowpipe; a device for supporting and propelling said blowpipe carried by said boom adjacent said free end portion; and boom support means being for supporting said boom and for positioning said supporting and propelling device centrally above said body, said boom support means adapted to support the boom in a relatively fixed position during the propulsion of said blowpipe, said support means and said device being together adapted to maintain the blowpipe and the metal body in a predetermined spaced relation during the cutting of the latter; all of said parts being so arranged that the free end portion of said boom and said device can be moved forwardly and downwardly into operative position adjacent said body or rearwardly and upwardly into inoperative position substantially spaced away from said body.

7. A machine for supporting and propelling a blowpipe across a metal body such as a round bar, which comprises the combination of a base adapted to be mounted adjacent one side of said body; a boom extending transversely of said body; means pivotally connecting said base and one end portion of said boom so that a free end portion thereof can be moved upwardly and rearwardly to a non-operating position and forwardly and downwardly to the operating position adjacent the metal body; a blowpipe adapted to impinge a metal removing gas stream against said metal body; a device carried by said boom adjacent said free end portion and constructed and arranged to support said blowpipe and to propel the latter transversely of said metal body; boom support means adjacent said free end portion and constructed and arranged to engage said body to support both said free end portion and said device in such relation to said body that said blowpipe is maintained in spaced relation to said body during such transverse propulsion of the blowpipe; and means associated with said boom for moving the free end portion of said boom, said device, and said blowpipe into a non-operating position.

8. In a machine for supporting and propelling a blowpipe transversely with respect to a metal body, a base adapted to be mounted adjacent one side of said body, a supporting member positioned above and extending transversely of said body, link means pivotally connected at one end to said base and at its other end to said supporting member, a blowpipe, a mechanism carried by said supporting member for supporting and moving said blowpipe to perform an oxygen cutting operation upon said body, a work-engaging member associated with said supporting member for engaging said body to position said supporting member and mechanism carried thereby in a relatively fixed position during said cutting operation, and means for moving said supporting member toward said metal body into operating position and away from said body into a non-operating position, the arrangement of said parts being such that said work-engaging member will shift said supporting member transversely to position said mechanism generally centrally with respect to said metal body when in the operating position.

HOMER W. JONES.

CERTIFICATE OF CORRECTION.

Patent No. 2,365,275. December 19, 1944.

HOMER W. JONES.

It is hereby certified that error appears in the printed specification of the above numbered patent requiring correction as follows: Page 1, first column, line 36, for "blow pipe" read --blowpipe--; page 2, second column, line 28, for "detailed" read --detail--; page 3, first column, line 65, claim 6, strike out the word "being" and insert the same after "means" in second column, line 3, same claim; and that the said Letters Patent should be read with this correction therein that the same may conform to the record of the case in the Patent Office.

Signed and sealed this 27th day of March, A. D. 1945.

Leslie Frazer (Seal) Acting Commissioner of Patents.